3 Sheets--Sheet 1.

O. P. DORAY.
Machine for Making Rope-Molding.

No. 161,600. Patented April 6, 1875.

Attest:
W<sup>m</sup> Dunn,
R. J. Brooks

O. P. Doray Inventor:
by his attorney
Jas. G. Arnold

THE GRAPHIC CO.PHOTO-LITH.39 & 41 PARK PLACE, N.Y.

O. P. DORAY.
Machine for Making Rope-Molding.

No. 161,600. Patented April 6, 1875.

Attest:
Wm N Dunn
R J Brooks

O. P. Doray Inventor:
by his attorney
Jas. G. Arnold

3 Sheets--Sheet 3.

O. P. DORAY.
Machine for Making Rope-Molding.

No. 161,600. Patented April 6, 1875.

Attest:
Wm Dunn.
R. J. Brooks.

O. P. Doray
Inventor:
by his Attorney
Jas. J. Arnold

THE GRAPHIC CO.PHOTO-LITH.39 & 41 PARK PLACE, N.Y.

UNITED STATES PATENT OFFICE.

ONESIPHORE P. DORAY, OF WORCESTER, MASSACHUSETTS.

IMPROVEMENT IN MACHINES FOR MAKING ROPE MOLDING.

Specification forming part of Letters Patent No. 161,600, dated April 6, 1875; application filed February 5, 1875.

*To all whom it may concern:*

Be it known that I, ONESIPHORE P. DORAY, of the city and county of Worcester, State of Massachusetts, have invented certain Improvements in Machines for Making Rope Moldings, or Twisted Moldings, of which the following is a specification:

My invention is designed for a feeding mechanism for rope-molding machines, and for similar purposes, where a rolling motion is wanted with the longitudinal one, or usual feed, and where it is desirable to have said motions variable, the one in regard to the other.

Its nature consists in the use of a pair of feed-rolls crossing each other at various determined angles, adjustable both in relation to position or the direction of the line of feed, and also toward and from each other, for different sizes, and to be adjustable to feed for the different degrees of twist or pitch of thread, making the machine self-operating or feeding, the adjustability of the rolls, and their position relative to each other, giving the desired rolling motion, combined with a longitudinal one for the various degrees of twist as well as size.

Figure 1:
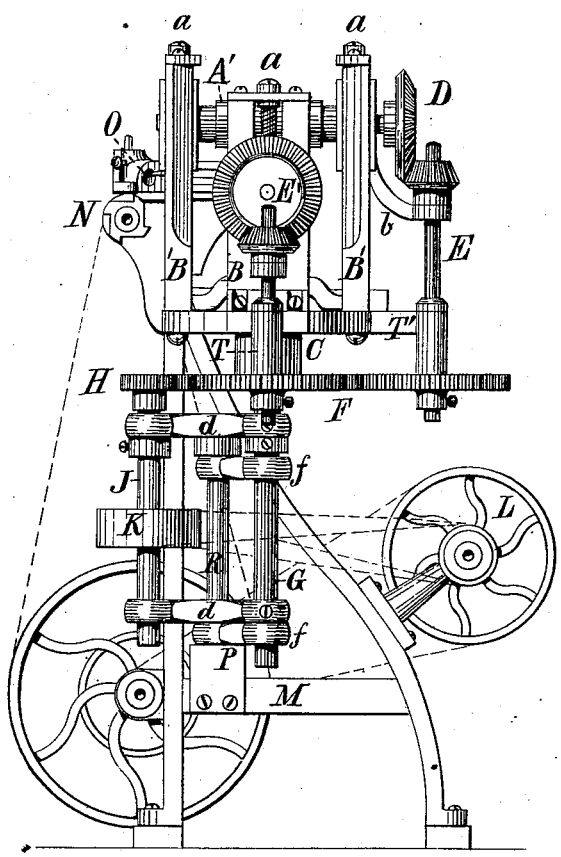
Figure 2:
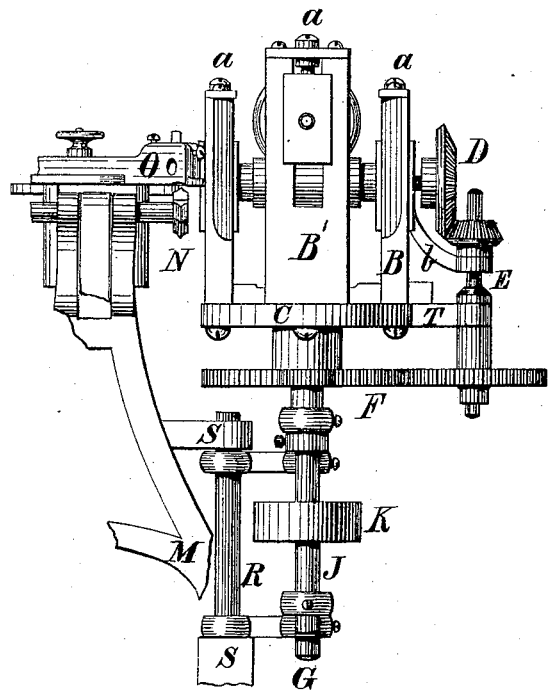
Figure 3:
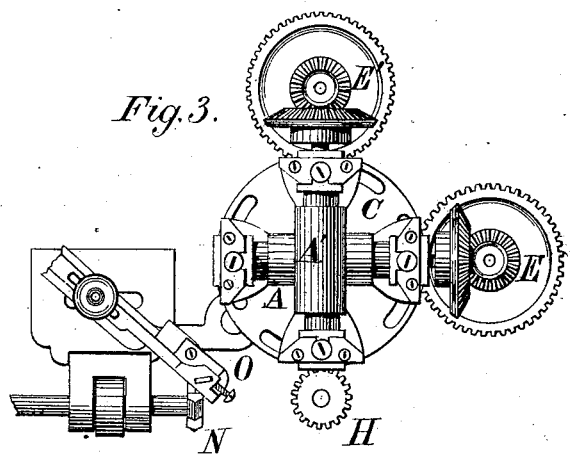
Figure 4:
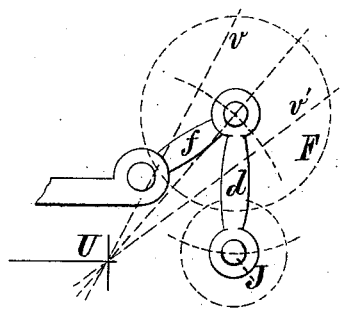
Figure 5:
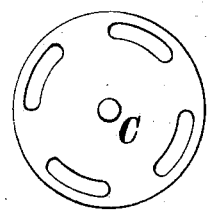
Figure 6:
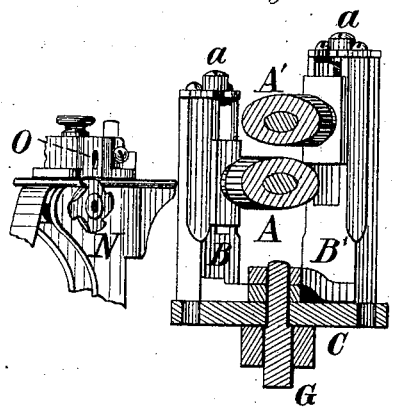
Figure 7:
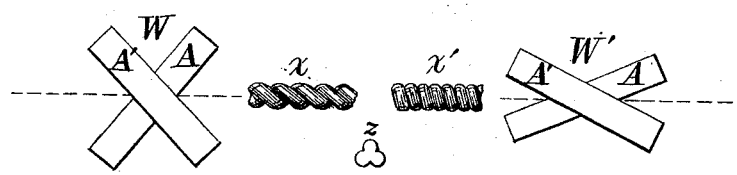
Figure 7:
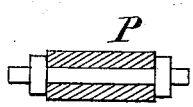

In the accompanying drawings, Figure 1 is a view of a machine embodying my invention, as applied to rope-molding machines. Fig. 2 is a view at right angles to Fig. 1. Fig. 3 is a plan or view from above. Fig. 4 is a diagram, showing the arrangement and operation of the adjustable supporting-arms. Fig. 5 is a plan of the supporting-plate. Fig. 6 is a vertical section through the center of the cross-rolls, on the line of feed, showing their supporting-plate and shaft. Fig. 7 shows the construction of the rolls, and the variations of twist made by the changes of the angle of their position relative to each other.

The same letters indicate the same parts wherever they occur.

A A' are the two rolls, each having bearings in sliding boxes adjustable by the screws *a a a* in the standards B B'. These standards are secured to the plate C by screws through its slots, whereby the rolls A A' can be set at various angles to each other, and the standards of each roll are connected at the bottom by a piece which is pivoted on the end of the shaft G, as shown in Fig. 6. On one end of the shaft of each roll is a gear, D, which is driven by a pinion supported in gear with it by an arm, *b*, attached to the adjacent box, and moving with it, the pinion sliding on its shaft E on a groove or a spline. The shafts E E' are each held by a piece, T T', attached to the standards carrying the rolls, and have each a gear on their lower ends driven by the gear F, which turns on the shaft G which supports the plate C, the gear F being driven by the gear H on the shaft J, which is supported by the arms *d d* from the shaft G, the shaft J receiving its motion from the pulley K, and a belt to a pulley, T, on the shaft L. The shaft G is supported, with all its attachments, by the arms *f f*, which, by rod R and brackets S S, connect it to the main frame M, and by the set-screws in *f f* its position relative to that of the cutter N and guide-rest O can be adjusted. The rolls A A' are made with an elastic central part, (I prefer rubber,) one of which is shown in section in Fig. 7, at P, and on each side of this I put a collar, slightly smaller, to keep the rubber from the oil of the journals.

These parts constitute the working parts of my machine, the details of them being variable for the different kinds of work.

The brackets S S and their rod R are firmly attached to the frame M of a molding-machine, of which N is the cutter, and O the guide-rest, through which the stick of molding passes. These (the cutter and its guide O) I do not claim, they having been used in the Patent No. 96,091, granted October 26, 1869, and are only shown to illustrate the application and operation of my invention.

In the diagram, Fig. 4, *u* shows the position of the cutter and guide-rest, and the lines *v* and *v'* the variations necessary for the different twists corresponding to *x* and *x'* of Fig. 7, while the position of the two rolls is shown at W and W' for *x* and *x'*, respectively. These are given as samples of the principles of adjustment, the right degree of set in each particular case being easily seen when in operation. The shaft J is made adjustable to arrange for the driving-belt to pulley K.

In operation the stick, after it passes the cutter, enters between the rolls A A', and they draw it through with a rolling or twist feed.

What I claim as new, and desire to secure by Letters Patent, is—

1. The supporting-arms $ff$, in combination with the pivoted feed mechanism, as above set forth.

2. The cross-rolls A and A', their pivoted stands B and B', the shafts J, E, and G, the gears F and H, and the arms $ff$ and $d\,d$, in combination, as and for the purposes above set forth and described.

O. P. DORAY.

Witnesses:
 WM. DUNN,
 R. J. BROOKS.